United States Patent [19] [11] 4,232,125
Buske [45] Nov. 4, 1980

[54] AMINOALKYLATION OF AROMATIC POLYMERS USING ALDEHYDE, DIACYLAMINE AND STRONG ACID CATALYST

[75] Inventor: Gary R. Buske, Midland, Mich.

[73] Assignee: The Dow Chemical Company, Midland, Mich.

[21] Appl. No.: 13,956

[22] Filed: Feb. 22, 1979

[51] Int. Cl.$^3$ .................... C08C 19/22; C08F 8/30
[52] U.S. Cl. ..................... 521/32; 525/374; 525/332
[58] Field of Search .............. 526/49; 521/32

[56] References Cited

U.S. PATENT DOCUMENTS

| | | | |
|---|---|---|---|
| 3,006,866 | 10/1961 | Corte et al. | 521/32 |
| 3,791,996 | 2/1974 | Wrichter | 521/32 |
| 3,925,264 | 12/1975 | Corte et al. | 521/32 |
| 3,989,650 | 11/1976 | Fonge et al. | 526/50 |
| 4,077,918 | 3/1978 | Corte et al. | 521/32 |

OTHER PUBLICATIONS

Berichte der Dt. Chem. Gesellschaft 31 (1898) 1232.

*Primary Examiner*—Joseph L. Schofer
*Assistant Examiner*—Peter F. Kulkosky

[57] ABSTRACT

A cross-linked polymer of a monovinylidene aromatic compound is diacylaminoalkylated by contacting said polymer with an aldehyde and a diacylamine in the presence of an acid catalyst. The resulting diacylaminoalkylated polymer is readily hydrolyzed to an aminoalkylated form which is useful as a weak base ion exchange resin and as a precursor in the preparation of other ion exchange resins. For example, reacting a cross-linked polystyrene with paraformaldehyde and phthalimide in the presence of sulfuric acid and subsequently hydrolyzing the reaction product forms a cross-linked poly(aminomethyl styrene) useful as a weak base ion exchange resin and as a precursor in the preparation of strong base or chelate type resins.

17 Claims, No Drawings

AMINOALKYLATION OF AROMATIC POLYMERS USING ALDEHYDE, DIACYLAMINE AND STRONG ACID CATALYST

BACKGROUND OF THE INVENTION

The present invention relates to a method for diacylaminoalkylating a cross-linked polymer of a monovinylidene aromatic compound and to methods for preparing ion exchange resins from the diacylaminoalkylated polymer.

Ion exchange resins are normally solid materials which have the ability to exchange ions in a liquid solution without substantial alteration of the solid resin's structure. For this reason, they are widely used in recovery processes such as the recovery of uranium and in waste treatment such as removing undesirable components from water.

Conventionally, many ion exchange resins are prepared by attaching active ion exchange groups to a cross-linked polymer of a monovinylidene aromatic. For example, an anion exchange resin is conventionally prepared by the aminoalkylation of said polymer. Typically, said aminoalkylation consists of the sequential steps of chloromethylation, amination and, if desired, alkylation. See, for example, *Ion Exchange*, by F. Helfferich, published in 1962 by McGraw-Hill Book Company, New York. Chloromethyl methyl ether is conventionally employed for such chloromethylation. Unfortunately, bischloromethyl ether, which in a recent New York University Medical Center report has been linked to bronchogenic cancer in rats, is commonly present in small amounts in the chloromethyl methyl ether.

Alternate methods for aminoalkylating an aromatic polymer which do not involve the use of chloromethyl methyl ether have been proposed for preparing anion exchange resins. For example, U.S. Pat. No. 3,006,866 to Corte and Netz discloses that a cross-linked polymer of a monovinylidene aromatic is aminoalkylated by (1) the condensation reaction of the cross-linked aromatic polymer and a preformed N-(haloalkyl)imide, e.g., N-chloromethyl succinimide, in the presence of a swelling agent and a Friedel-Crafts catalyst and (2) the hydrolysis of the resulting reaction product. Unfortunately, the condensation reaction liberates highly corrosive hydrogen halides, e.g., HCl, and requires elevated temperatures. A similar method of aminoalkylation which does not liberate hydrogen halide is presented in U.S. Pat. No. 3,925,264 to Corte, Heller and Netz wherein a preformed N-(hydroxyalkyl)imide is employed in place of the N-(haloalkyl)imide. Unfortunately, said process requires the undesirable step of removing water during the condensation reaction. Moreover, the preparation of the preformed N-(haloalkyl)imide or N-(hydroxyalkyl)imide in said methods requires the undesirable expenditures of substantial time and apparatus.

In view of the stated deficiencies of the prior art methods for aminoalkylating an aromatic polymer, it remains highly desirable to effectively prepare anion exchange resins by a method which does not involve the use of chloromethyl methyl ether.

SUMMARY OF THE INVENTION

Accordingly, one aspect of the present invention is a method for diacylaminoalkylating a cross-linked polymer of a monovinylidene aromatic, said method comprising the step of contacting the aromatic polymer with an aldehyde and a suitably reactive diacylamine in the presence of an amount of an acid catalyst and under conditions sufficient to diacylaminoalkylate the aromatic polymer.

In another aspect, the present invention is a method for preparing ion exchange resins from said diacylaminoalkylated polymer. In such method, a weak base resin of an aminoalkylated cross-linked aromatic polymer bearing a pendant primary amino group is prepared by hydrolyzing the diacylaminoalkylated polymer. Other weak base resins, strong base resins and chelate type resins are easily prepared from the resulting aminoalkylated polymer using conventional techniques.

The method of the present invention is unique in that the diacylamine and aldehyde effectively diacylaminoalkylate the cross-linked aromatic polymer. Moreover, the diacylaminoalkylated polymers are readily converted to ion exchange resins having excellent capacity.

The diacylaminoalkylated polymers are useful precursors in the preparation of gel and macroporous ion exchange resins. The ion exchange resins prepared therefrom are useful for removing electrolytes from water and other liquids in such processes as desalting, demineralizing and other purification processes.

DETAILED DESCRIPTION OF THE INVENTION

In general, the cross-linked monovinylidene aromatic polymers useful in the practice of the present invention are the normally solid, addition copolymerization products of a monovinylidene aromatic and a cross-linking agent copolymerizable therewith; typically, a polyethylenically unsaturated monomer.

Kinds of polymerizable monovinylidene aromatics, cross-linking agents, catalysts, polymerization media and methods for preparing the cross-linked addition copolymers as granules or as spheroidal beads of either a gel or macroporous (macroreticular) form, are well known in the art and reference is made thereto for the purposes of this invention. Illustrative of such are U.S. Pat. Nos. 2,960,480; 2,788,331; 2,642,417; 2,614,099 and 2,591,573 for the preparation of the cross-linked addition copolymer in gel form and U.S. Pat. Nos. 3,637,535; 3,549,562 and 3,173,892 for the preparation of a more porous cross-linked copolymer, i.e., the so-called macroporous material, all of which are hereby incorporated by reference.

Of the known polymerizable monovinylidene aromatics useful in the preparation of the cross-linked addition copolymers, styrene and vinylnaphthalene are generally preferred in the practice of this invention. Although monoalkyl substituted styrenes such as vinyltoluene and ethyl vinylbenzene can also be employed, especially if the substituent groups are not in a para position with respect to each other, said monoalkyl substituted styrenes are most advantageously employed in combination with styrene.

Preferred of the known cross-linking agents are the polyvinylidene aromatics such as divinylbenzene, divinyl toluene, divinyl xylene, divinyl naphthalene, divinyl sulfone, trivinylbenzene, divinyldiphenyl ether, divinyldiphenyl sulfone and isopropenyl vinylbenzene; divinyl sulfide; ethylene glycol dimethacrylate and the like. Of such cross-linking agents, divinylbenzene and divinyldiphenyl sulfone, especially divinylbenzene, are preferred herein.

Advantageously, the cross-linked aromatic polymers are prepared in macroporous form as spheroidal beads, preferably with an average diameter of from about 0.04 to about 1.4 mm, with an average diameter between about 0.3 and about 1.2 being more preferred.

Aldehydes suitably employed in this invention are aldehydes or aldehyde generating materials which, when employed in conjunction with a diacylamine as hereinafter described, are capable of diacylaminoalkylating the cross-linked addition copolymer. In the normal practice of this invention, the copolymer is advantageously diacylaminomethylated. As such, gaseous formaldehyde or formaldehyde generating materials such as trioxane and paraformaldehyde are advantageously employed herein. Acetaldehyde has not been found to be generally employable herein. Preferred aldehydes are paraformaldehyde and trioxane, with paraformaldehyde being especially preferred.

The diacylamines suitably employed in this invention are suitably reactive diacylamines which contain a diacylamino, i.e.,

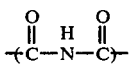

group, which diacylamine, when employed in conjunction with an aldehyde as hereinbefore described, is capable of diacylaminoalkylating the cross-linking aromatic polymer. In general, phthalimide and maleimide are advantageously employed in the practice of this invention. Preferred of the diacylamines useful herein is phthalimide. Other diacylamines such as diacetamide, succinimide, 1,8-naphthalimide and 1,4,5,8-naphthalenetetracarboxylic acid diimide have not been found to be generally employable herein.

The aldehyde and diacylamine are employed in amounts sufficient to diacylaminoalkylate the aromatic polymer. For the purposes of this invention, an aromatic polymer is suitably diacylaminoalkylated if at least about 30 percent of the total number of aromatic nuclei in the resulting aromatic polymer have been diacylaminoalkylated, assuming that the diacylaminoalkylation occurs once on each of said polymerized monomeric units before any of said units are diacylaminoalkylated a second time. Advantageously, at least about 50, preferably at least about 70, more preferably at least about 80, percent of the nuclei are diacylaminoalkylated. For the purposes of this invention, this percent, i.e., the degree of diacylaminoalkylation, is easily calculated from the weight gain in the cross-linked polymer exhibited during diacylaminoalkylation or from the percent nitrogen found in the diacylaminoalkylated cross-linked polymer as exemplified hereinafter by Example 1.

The amounts of the aldehyde and diacylamine most advantageously employed herein will vary depending on the specific aromatic polymer, aldehyde and diacylamine employed; and the conditions of said diacylaminoalkylation. Typically, in the preparation of the cross-linked aromatic polymer, from about 0.3 to about 3, preferably from about 0.5 to about 1.5, moles of each of the diacylamine and aldehyde are advantageously employed for each mole of the monovinylidene aromatic used. Most preferably, the aldehyde and diacylamine are employed in stoichiometric amounts with respect to each other, with from about 0.8 to about 1.2 moles of each being employed for each mole of the monovinylidene aromatic compound employed in preparing the cross-linked polymer.

Acid catalysts suitably employed herein are water-soluble Lewis acids which are capable of catalyzing the diacylaminoalkylation reaction. Advantageously, such acids have a pKa, i.e., the negative logarithm (base 10) of the acidity constant of the acidic group in water at 25° C., of less than about 1.5. Representative of such acids are the alkyl or aryl sulfonic or phosphoric acids, e.g., p-toluene sulfonic acid; trichloro (or fluoro) acetic acid; mineral acids such as polyphosphoric acid, sulfuric acid, hydrochloric acid, and mixtures thereof. In addition, mixtures of said acids with other weaker acids; e.g., acetic acid, can also be employed. Preferred of the acid catalysts is sulfuric acid.

The acid catalyst is advantageously employed in amounts sufficient to catalyze the diacylaminoalkylation reaction. Typically, such amounts will vary depending on the type and concentration of the reactants, i.e., the aldehyde, diacylamine and the cross-linked aromatic polymer, and the reaction conditions employed. Generally, the acid catalyst is employed in amounts from about 1 to about 15, preferably from about 2 to about 10, weight parts per weight parts of the cross-linked aromatic polymer.

In the practice of this invention, the cross-linked aromatic polymer is diacylaminoalkylated by contacting said polymer with the diacylamine and the aldehyde in the presence of the acid catalyst and at conditions sufficient to diacylaminoalkylate the polymer.

Although the diacylaminoalkylation may be conducted neat, the aromatic polymer is advantageously dispersed in and swollen by a reaction diluent. The diacylaminoalkylation is conducted while the polymer is in this swollen state. Reaction diluents suitably employed include relatively volatile organic liquids less reactive to the diacylaminoalkylation reaction than the cross-linked aromatic polymer, and which are capable of swelling the polymer to some limited degree, e.g., 20 percent. Preferably, the reaction diluent is essentially inert to the diacylaminoalkylation reaction. Although the reaction diluents most advantageously employed will vary with the aldehyde, diacylamine and cross-linked polymer, liquids of halogenated hydrocarbons such as ethylene dichloride, methylene chloride, carbon tetrachloride, tetrachloroethylene, trichloroethylene, and 1,1,2-trichloroethane; nitro-substituted hydrocarbons, preferably aliphatic or aromatic nitro-substituted hydrocarbons such as 1- or 2-nitropropane, nitrobenzene, dioxane and tetrahydrofuran; mixtures thereof and the like are advantageously employed. Preferred reaction diluents are ethylene dichloride and methylene chloride with ethylene dichloride being most preferred. When employed, the reaction diluent is advantageously employed in amounts from about 3 to about 12, preferably about 4 to about 6, weight parts per weight parts of the cross-linked aromatic polymer.

The diacylamnoalkylation is advantageously conducted at temperatures from about room temperature (e.g., 18°–25° C.) to a temperature at which the reaction diluent boils. Generally, the reaction temperature is preferably from about 20° to about 90° C., with room temperatures being most preferred. While reaction pressure is not critical, pressures between about 0 psig and about 25 psig while venting the reactor is typically advantageously employed.

In conducting the diacylaminoalkylation, although the order of addition of the catalyst and reactants is not particularly critical, the acid catalyst is preferably added to a reactant mixture, i.e., a mixture of the reaction diluent and the reactants. During this addition, the temperature of the reactant mixture is maintained within the temperature range hereinbefore specified and said mixture is advantageously agitated to maintain an essentially homogeneous mixture of the reactants. The addition of the acid catalyst to the reactant mixture can be continuous, batchwise or incremental, i.e., added as shots in two or more increments, with continuous addition being preferred to control the heat generated by the addition of the catalyst. Most preferably, the acid catalyst is continuously added to the reactant mixture at a rate such that the resulting mixture is maintained at a temperature less than about 50° C. Generally, such addition takes from about 10 to about 60 minutes. Alternatively, but less preferred, the aldehyde and/or the diacylamine can be added in a similar manner to a mixture of the reaction diluent, acid catalyst and other reactants.

At the specified temperatures, diacylaminoalkylation generally requires a reaction time of at least about 0.5, advantageously at least about 2 hours. Preferably, reaction times from about 5 to about 16 hours are employed.

Following diacylaminoalkylation, the resulting diacylaminoalkylated cross-linked polymer is converted to an aminoalkylated cross-linked polymer bearing a primary amino group using conventional alkaline or acidic hydrolysis techniques well known in the art. In the normal practice of this invention, the hydrolyzed polymer is an aminomethylated cross-linked polymer wherein a primary amino group is attached to a benzylic carbon atom.

Typically, prior to said hydrolysis, the diacylaminoalkylated cross-linked aromatic polymer is recovered from the remainder of the reaction medium using conventional techniques, e.g., filtration. The recovered diacylaminoalkylated polymer is then advantageously washed with a volatile, organic liquid such as 1,2-dichloroethane, acetone, methanol, dioxane, tetrahydrofuran, or the like, to remove residual catalyst and unreacted aldehyde and diacylamine.

In general, acid hydrolysis of the diacylaminoalkylated cross-linked polymer typically consists of contacting the washed polymer with an aqueous solution of from about 5 to about 80 weight percent of an acid hydrolyzing agent such as a mineral acid, e.g., hydrochloric, hydrobromic or sulfuric acid, at a temperature between about 50° and about 200° C. Alkaline hydrolysis is typically conducted by contacting the washed polymer with an aqueous or alcoholic solution of from about 5 to about 40 weight percent of an alkaline hydrolyzing agent such as sodium hydroxide, potassium hydroxide or the like at temperatures between about 50° and about 250° C. Advantageously, in either acid or base hydrolysis, the hydrolyzing agent is employed in molar excesses.

Alternatively, the diacylaminoalkylated polymer is not separated from the reaction medium and hydrolysis is carried out in the same medium as the diacylaminoalkylation. In such case, the acid employed in the diacylaminoalkylation reaction is often advantageously employed as the hydrolyzing agent.

The resulting hydrolyzed, cross-linked polymer is a weak base ion exchange resin bearing a pendant primary amino group, which group is typically bonded to a benzylic carbon atom. This hydrolyzed polymer is easily recovered by conventional techniques, i.e., filtration, and is then beneficially washed with a dilute acidic or alkaline aqueous solution and thereafter with water until neutral.

The resulting hydrolyzed polymers can be alkylated by conventional techniques well known in the art to form weak base ion exchange resins having secondary or tertiary amino groups or a strong base resin bearing quaternary ammonium groups, all of which groups are generally bonded to a benzylic carbon atom. Typically, said alkylation comprises contacting the hydrolyzed polymer with an excess molar amount of a alkylating agent such as an alkyl halide, e.g., methyl chloride; a dialkyl sulphate, e.g., dimethylsulphate; an alkylene oxide, e.g., ethylene oxide; a halohydrin, e.g., propylene chlorohydrin; a polyhalogen compound, e.g., glycerol dichlorohydrin; or epihalohydrin, at temperatures generally between about 20° and about 125° C. Advantageously, the alkylation is conducted in the presence of a reaction diluent such as methanol, water or the like and a basic material such as potassium hydroxide, sodium hydroxide, magnesium oxide, calcium oxide or the like. Depending on the type and amount of alkylating agent employed and the conditions of alkylation, the resulting cross-linked polymer bears a secondary, tertiary or quaternized amino group or a mixture thereof.

Alternatively, a tertiary amino derivative can be prepared from the hydrolyzed polymer by employing formic acid and formaldehyde in excess molar amounts. In such alkylation, formaldehyde and water are typically added to a mixture of the hydrolyzed polymer, formic acid and, optionally, a minor proportion of a mineral acid. Typically, alkylation advantageously proceeds at reaction temperatures between about 80° and about 120° C. The resulting tertiary amino derivative is readily converted to a quaternized derivative by reacting the tertiary amino derivative with an alkylene oxide and/or halohydrin, e.g., epichlorohydrin, at temperatures from about 10° to about 120° C. in the presence of a diluent such as water.

The hydrolyzed polymer can also be converted to a chelate resin by attaching chelate active exchange groups, e.g., iminodiacetic acid groups, thereto. In general, chelate resins are advantageously prepared by reacting the hydrolyzed polymer with an excess molar amount of a suitable reactive carboxyl containing compound such as a halogenated carboxylic acid or an alkali metal salt thereof, e.g., chloroacetic acid, or an $\alpha,\beta$-ethylenically unsaturated carboxylic acid or alkali metal salt thereof, e.g., acrylic acid. Advantageously, the chelate type resin is prepared by contacting the carboxyl containing compound with the hydrolyzed polymer in an alkaline aqueous medium having the carboxyl containing compound dissolved therein. Beneficially, the reaction medium is maintained at a pH from about 8 to about 14 and at a temperature from about 50° to about 100° C.

The following examples are presented to illustrate the present invention and should not be construed to limit its scope. All percentages and parts in the examples are by weight unless otherwise indicated.

EXAMPLE 1

A. Preparation of a Diacylaminoalkylated Cross-Linked Polymer

To a suitable size flask equipped with a thermometer, stirrer, reflux means and heating and cooling means is added 500 ml of 1,2-dichloroethane, 147.1 g of phthalimide, 31.3 g of paraformaldehyde (96 percent by weight) and 104 g of a macroporous resin, in spheroidal bead form, prepared from 84 parts styrene, 8 parts ethyl vinylbenzene and 8 parts divinylbenzene and using 43.5 percent, by weight, of an isooctane diluent during the polymerization of the monomers to impart porosity thereto.

This mixture is mildy agitated for 30 minutes at 22° C., which allows the beads to swell in the dichloroethane. A 200 ml portion of an aqueous solution of 96.3 weight percent sulfuric acid is added dropwise to the mixture for about 0.5 hour, during which addition the temperature of the flask rises to about 50° C. Following the addition of the sulfuric acid, the flask is allowed to cool to 22° C., which takes about 1 to about 1.5 hours. While agitating the reaction mixture, this temperature is maintained for 24 hours. At the end of this period, water and ice are added to the mixture and the resulting diacylaminoalkylated beads are recovered by filtration.

The beads are washed with 1,2-dichloroethane, methanol, water and alternately with acetone and then methanol three times. The washed beads are vacuum dried. The dried beads weigh about 241 g. Based on the weight gained by the copolymer bead, the degree of diacylaminoalkylation, i.e., the percent of the aromatic nuclei in the cross-linked aromatic polymer which have been diacylaminoalkylated, is found to be 86 percent. Using conventional elemental analysis techniques, the percent nitrogen, by weight, in the diacylaminoalkylated polymer is found to be about 5.04 percent. Using this nitrogen content, the degree of diacylaminoalkylation is determined to be about 88 percent.

B. Hydrolysis of the Diacylaminoalkylated Polymer

To hydrolyze the resulting diacylaminoalkylated beads, a mixture of 116 g of the washed beads and 360 ml of a 15 percent aqueous solution of sodium hydroxide is placed in a suitable size Parr bomb reactor. The Parr reactor is heated to 180° C. and maintained at this temperature for about 10 hours. At the end of this period, the Parr reactor is cooled and the beads recovered by filtration. The recovered beads are washed with water until neutral. Upon drying, using conventional vacuum drying techniques, the dried hydrolyzed beads weigh about 64.7 g, are found to have a dry weight capacity of 6.4 meq/g and contain 8.99 percent nitrogen. Based on this nitrogen analysis, 83 percent of the aromatic nuclei in the hydrolyzed copolymer are found to contain aminomethyl groups.

C. Alkylation of Hydrolyzed Polymer

A 5 g sample of the resulting beads are added to a suitable size flask equipped with an agitator, reflux means, thermometer and heating and cooling means. To the beads is added 8.4 g of an aqueous solution of 89.9 percent formic acid while the flask is maintained at 50° C. Following said addition, 13.3 g of formaldehyde (a 37.2 percent aqueous solution) and sufficient water to make a stirrable slurry (about 25 ml) are added. The resulting mixture is heated to 50° C. for 1 hour. The mixture is then heated to 75° C. for 1.5 hours; followed by heating 4 hours at 90° C. The mixture is then cooled to ambient temperatures. The beads are filtered from the resulting mixture, washed sequentially with water, 1 N (Normal) sodium hydroxide and water. The resulting beads are a weak base ion exchange resin of a copolymer of styrene and divinylbenzene bearing dimethylaminomethyl groups. The beads are vacuum dried, found to weigh 5.5 g and have a dry weight capacity of 4.6 meq/g.

A mixture of 4 g of the above beads (the copolymer beads bearing dimethylaminomethyl groups), 2 ml of water, 40 ml of 2-chloroethanol and 0.1 g of potassium iodide is added to a suitable size flAsk similar to the flask employed hereinbefore. The mixture is heated in a steam bath for 24 hours. At the end of this period, the mixture is cooled and the beads filtered therefrom. The recovered beads are washed with 1 N hydrochloric acid and then with water until neutral. The resulting beads are a strong base ion exchange resin of a copolymer having 2-hydroxyethyl dimethylaminomethyl functional groups which weighs about 6.7 g and contains about 22 percent water. The resulting beads have a total dry weight capacity of 3.8 meq/g and a strong base capacity of 2.8 meq/g.

Alternatively, a strong base ion exchange resin is prepared by adding a mixture of 41 g of methyl iodide and 30 ml of methanol to about 10 g of the hydrolyzed beads, 16 g of sodium bicarbonate, 30 ml of methanol and 20 ml of water contained in a 250 ml flask similar to the one described hereinbefore. During this addition the temperature rises to about 30°–33° C. Following this addition, the mixture is gently refluxed for about 16 hours at temperatures between 35° and 50° C. The mixture is then cooled and the beads filtered therefrom. The beads are then washed with an aqueous solution of 5 percent hydrochloric acid and then water (about 1600 ml) until neutral. The resulting beads are a strong base resin of a copolymer having trimethylaminomethyl groups, which beads weigh about 38.2 g and contain about 60.7 percent water. The resulting beads have a total dry weight capacity of 3.95 meq/g and a strong base capacity of 3.94 meq/g.

D. Preparation of Chelate Resin From A Hydrolyzed Polymer

Into a suitable size flask containing an agitated mixture of 5 g of the hydrolyzed beads, 3.4 g of chloroacetic acid and sufficient water to make a stirrable slurry (about 20 ml) is added, 6.3 g of an aqueous solution of 20 percent sodium hydroxide. The resulting mixture is heated at 70° C. for 30 minutes and 6.3 g of an aqueous solution of 20 percent sodium hydroxide and the resulting mixture stirred for 10 minutes. Then, 3.4 g of chloroacetic acid is added, followed by an additional 10 minutes of agitation and then the addition of 6.3 g of an aqueous solution of 20 percent sodium hydroxide. The mixture is then heated to 70° C. for about 2 hours with an additional 6.3 g of an aqueous solution of 20 percent sodium hydroxide being added after 1 hour of heating. At the end of this period, the mixture is cooled, the beads recovered by filtration and sequentially washed with 1 N sodium hydroxide and water. The resulting beads are a chelate type exchange resin (iminodiacetate groups) which contain 36.5 percent water and weigh 12.0 g wet. They are found to have dry weight capacity for cupric ions of about 2.76 meq/g.

By this example, the method of this invention is shown to be effective in diacylaminomethylating a cross-linked aromatic polymer. More importantly, anion exchange resins, both weak and strong base, and chelate resins having excellent capacities can be prepared from the diacylaminomethylated polymer.

EXAMPLE 2

In a manner similar to that of Example 1, a 104 g sample of a cross-linked aromatic copolymer similar in all respects to the copolymer of Example 1 is diacylaminoethylated using 97 g of maleimide and 31.3 g of paraformaldehyde. The resulting diacylaminomethylated cross-linked polymer is found to contain 6.28 percent nitrogen, by weight, which corresponds to a degree of diacylaminomethylation of 90.4 percent.

Similarly, a 104 g sample of a similar copolymer is diacylaminomethylated employing 194 g of maleimide and 62.6 g of paraformaldehyde. The resulting diacylaminomethylated polymer contains 7.07 percent nitrogen, by weight, corresponding to a 116 percent degree of diacylaminoalkylation; indicating that some aromatic nuclei have been diacylaminomethylated more than a single time.

A 104 g sample of a similar copolymer is diacylaminoalkylated using 97 g of maleimide and 31.3 g of paraformaldehyde in a like manner except that the diacylaminoalkylation is carried out at about 84° C., while allowing the ethylene dichloride to reflux. Upon completion of the reaction, the diacylaminomethylated copolymer contains 5.51 percent nitrogen, by weight, which corresponds to about a 71 percent degree of diacylaminoalkylation.

As evidenced by this experiment, the methods of this invention are useful for diacylaminomethylating a cross-linked aromatic polymer over a wide range of reaction conditions. The degree of diacylaminoalkylation is shown to be dependent on these reaction conditions.

What is claimed is:

1. A method for diacylaminoalkylating a cross-linked polymer of a monovinylidene aromatic compound, said method comprising the step of contacting the polymer with an aldehyde and either phthalimide or maleimide in the presence of a strong acid catalyst and under conditions sufficient to diacylaminoalkylate the polymer.

2. The method of claim 1 wherein the cross-linked polymer is the normally solid, addition copolymerization product of a monovinylidene aromatic and a polyethylenically unsaturated monomer.

3. The method of claim 2 wherein the aldehyde is gaseous formaldehyde or a formaldehyde generating material.

4. The method of claim 3 wherein the aldehyde is gaseous formaldehyde, paraformaldehyde or trioxane.

5. The method of claim 4 wherein from about 0.5 to about 1.5 moles of each of the diacylamine and aldehyde are employed for each mole of the monovinylidene aromatic used in the preparation of the cross-linked aromatic polymer and the acid is employed in amounts from about 1 to about 15 weight parts per weight parts of the cross-linked aromatic polymer.

6. The method of claim 4 wherein the acid is a water-soluble acid having a pKa of less than about 1.5

7. The method of claim 4 wherein the acid is an alkyl or aryl sulfonic or phosphoric acid, trichloroacetic acid, trifluoroacetic acid, a mineral acid, or mixtures thereof.

8. The method of claim 6 wherein the acid is sulfuric.

9. The method of claim 4 wherein the cross-linked polymer is in the form of macroporous, spheroidal beads.

10. The method of claim 4 wherein the diacylaminoalkylation reaction is conducted in a reaction diluent of a halogenated hydrocarbons or a nitro substituted hydrocarbon.

11. The method of claim 9 wherein the reaction diluent is ethylene dichloride or methylene chloride and is employed in amounts from about 3 to about 12 weight parts per weight parts of the cross-linked aromatic polymer.

12. The method of claim 10 wherein from about 0.8 to about 1.2 moles of each of the diacylamine and aldehyde are employed per mole of monovinylidene aromatic used in the preparation of the cross-linked polymer, the acid is sulfuric acid and is employed at from about 2 to about 10 weight parts per weight parts of the cross-linked aromatic polymer, the diacylamine is phthalimide and the diacylaminoalkylation is conducted at a temperature from about 20° to about 90° C.

13. A method for preparing a weak base resin of an aminoalkylated cross-linked aromatic polymer bearing a pendant primary amino group from the diacylaminoalkylated polymer of claim 1 or 4, said method comprising the step of hydrolyzing the diacylaminoalkylated polymer.

14. A method for preparing an anion exchange resin bearing pendant secondary or tertiary amino groups or quaternary ammonium groups from the aminoalkylated polymer of claim 13, said method comprising alkylating the aminoalkylated polymer.

15. A method for preparing a chelate resin from the aminoalkylated cross-linked aromatic polymer of claim 13, said method comprising attaching carboxyl containing groups to the nitrogen atom of the aminoalkylated polymer.

16. The method of claim 12 wherein the acid catalyst is supplied in a form of at least about 96 weight percent sulfuric acid.

17. The method of claim 16 wherein the diacylaminoalkylation is conducted at a temperature of less than about 50° C.

* * * * *

UNITED STATES PATENT AND TRADEMARK OFFICE
CERTIFICATE OF CORRECTION

PATENT NO. : 4,232,125
DATED     : November 4, 1980
INVENTOR(S) : Gary R. Buske

It is certified that error appears in the above—identified patent and that said Letters Patent is hereby corrected as shown below:

Column 3, line 29, delete "cross-linking" insert --cross-linked--
Column 4, line 58, delete "diacylamnoalkylation" insert
            --diacylaminoalkylation--
Column 5, line 68, delete "i.e.," insert --e.g.,--
Column 6, line 11, delete "a alkylating" insert --an alkylating--
Column 7, line 8, delete "mildy" insert --mildly--

Column 8, line 6, delete "flAsk" insert --flask--
Column 8, line 46, insert after "30 minutes and"--then cooled to
      25°C. To the cooled mixture is added--
Column 10, line 5, insert --.-- at the end
Column 10, line 15, delete "hydrocarbons" insert --hydrocarbon--

Signed and Sealed this

Seventh Day of April 1981

[SEAL]

Attest:

RENE D. TEGTMEYER

Attesting Officer        Acting Commissioner of Patents and Trademarks